United States Patent [19]

Sakai

[11] Patent Number: 4,872,584
[45] Date of Patent: Oct. 10, 1989

[54] SAFETY DEVICE FOR A RADIATOR CAP

[75] Inventor: Takashi Sakai, Saitama, Japan

[73] Assignees: Akebono Brake Industry Co., Ltd., Tokyo, Japan; Akebono Research and Development Centre Ltd., Saitama, Japan

[21] Appl. No.: 226,337

[22] Filed: Jul. 27, 1988

[30] Foreign Application Priority Data

Aug. 28, 1987 [JP] Japan .......................... 62-130177[U]

[51] Int. Cl.$^4$ .............................................. B65D 55/00
[52] U.S. Cl. ..................................... 220/201; 220/326; 220/DIG. 32
[58] Field of Search ............... 220/201, 315, 316, 326, 220/DIG. 32, DIG. 33

[56] References Cited

U.S. PATENT DOCUMENTS 2,125,419  8/1938  Birk .................................. 220/201 X
2,528,372 10/1950  Kellogg ............................. 220/201
4,457,327  7/1984  Pepper ............................. 220/201 X
4,489,883 12/1984  Anderson ......................... 220/201 X

FOREIGN PATENT DOCUMENTS 1076494  7/1967  United Kingdom ............... 220/201

Primary Examiner—Stephen Marau
Assistant Examiner—Nova Stucker
Attorney, Agent, or Firm—Finnegan, Henderson, Farabow, Garrett, & Dunner

[57] ABSTRACT

The present invention concerns a safety device for a radiator cap detachably mounted on a fluid supply opening for closing the radiator opening. The safety device comprises a lock means for preventing the opening of the radiator cap when the temperature of the coolant in the radiator is higher than a predetermined value. The lock means is provided between the radiator cap and an inner surface of the fluid supply opening. The lock means comprises a lock portion provided on an inner surface of the fluid supply opening and a lock member fixedly secured to the radiator cap. The lock member is formed of a shape memory alloy.

6 Claims, 1 Drawing Sheet

SAFETY DEVICE FOR A RADIATOR CAP

FIELD OF THE INVENTION

The present invention relates to a safety device for a radiator cap that prevents the radiator cap from being detached while the temperature of the coolant in the radiator or the radiator itself is higher than a predetermined temperature value.

BACKGROUND OF THE INVENTION

During the period where the radiator is in an overheat condition or the radiator temperature is excessively high, if the radiator cap is detached for checking the radiator or for supplying a coolant the radiator, there is the danger that boiling water could be expelled or blown off from the fluid supply opening of the radiator. As a result a dangerous scald or the like could be inflicted. There is no conventional device which can prevent such a danger.

SUMMARY OF THE INVENTION

An object of the present invention is to overcome the problems and disadvantages of the prior art. Therefore, an object of the present invention is to eliminate the afore-mentioned danger of the radiator. That is, an object of the present invention is to provide a safety device for a radiator cap which can prevent boiling water from blowing off from the opening of the radiator thereby causing a scald or the like. The safety device for a radiator cap of the present invention is provided on a radiator cap that is detachably mounted on the cylindrical fluid supply opening of the radiator to close the opening off. The safety device is provided with a lock means disposed between the radiator cap and an inner peripheral surface of the fluid supply opening. The lock means prevents the cap from being detached when a temperature of the coolant in the radiator is higher than a predetermined value. The lock means comprises a lock member formed of a shape memory alloy. The lock means is fixedly secured to the rear side of the radiator cap. A lock portion is disposed at the inner surface of the fluid supply opening.

At the point where the coolant temperature in the radiator is lower than the predetermined temperature value, the lock member formed of the shape memory alloy does not restore or remains substantially straight. Accordingly, the cap can freely be detached as the cap is not locked by the lock member. When the temperature in the radiator exceeds the predetermined temperature value, the lock member restores or returns to its flexed state to lock the radiator cap with the lock portion located at the radiator side. Consequently, the cap may not be detached from the opening of the radiator, thereby preventing the likelihood of the boiling water exploding from the opening of the radiator when the cap is detached. Since the lock action of the present invention is performed by a function of the shape memory alloy, the lock means can be made simple in structure and low in manufacturing cost.

BRIEF DESCRIPTION OF THE DRAWINGS

The accompanying drawings, which are incorporated in and constitute a part of this specification, illustrate several embodiments of the present invention and together with the description, serve to explain the principles of the present invention.

DETAILED DESCRIPTION OF THE PREFERRED EMBODIMENTS

A preferred embodiment of the present invention will be described with reference to accompanying drawings.

Figure 1:
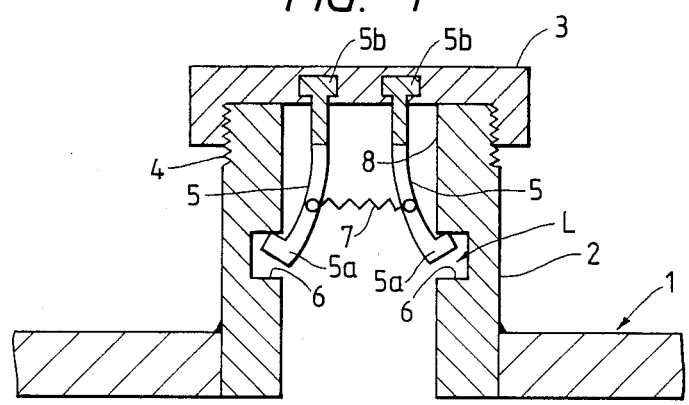
FIG. 1 shows a safety device according to the present invention during the locked condition.

FIG. 1 shows the radiator 1 according to the present invention provided with a cylindrical fluid supply opening 2 having a screw portion 4 at its outer end. The screw portion 4 is threadably connected to a radiator cap 3 for closing off the opening 2. The radiator 1 is provided with a lock means L which acts to prevent the cap 3 from being detached when the temperature of a coolant in the radiator 1 or of the radiator itself exceeds a predetermined temperature value capable of, for example, inflicting a scald or burn. The lock means L includes a lock member 5 formed of a shape memory alloy and secured to the radiator cap 3. The lock members engages a lock portion 6 disposed at an inner surface 8 of the fluid supply opening 2 when the temperature exceeds the predetermined temperature value.

More specifically, a pair of lock members 5 are provided with a hook 5a at one end and a base portion 5b at another end, respectively. The lock members 5 are each formed of a shape memory alloy. As shown in FIG. 1, the lock member 5 is preshaped so that the hook 5a expands outwardly with respect to the base portion 5b below a predetermined temperature value. The base portion 5b of the lock member 5 is fixedly secured to the radiator cap 3 so that the pair of the lock members 5 are integrally connected to the radiator cap 3. A spring 7 is disposed between the lock members 5 so that the spring 7 to urge the lock members 5 inwardly or toward one another.

That is, when the temperature of the coolant in the radiator 1 or the radiator itself is lower than the predetermined temperature value, the lock members 5 are urged by an elastic force of the spring 7 so that each of the hooks 5a disengages from the respective lock portions 6. Under this condition, if the temperature of the coolant in the radiator 1 exceeds the predetermined value, the hooks 5a of the lock member 5 expand outwardly by a restoring force of the shape memory alloy against the elastic force of the spring 7 so that the hooks 5a engage with the respective lock portions 6 of the opening 2.

Figure 2:
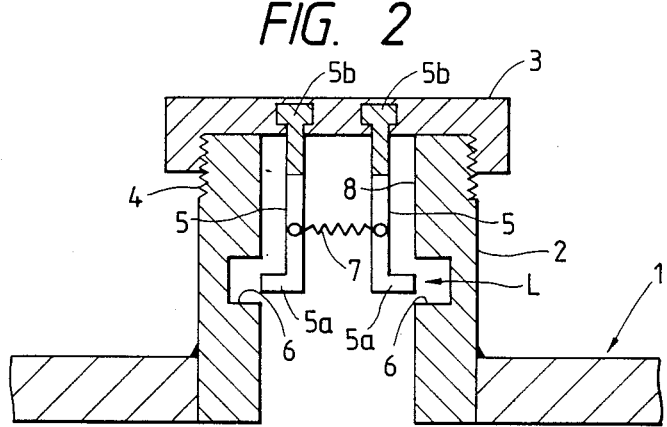
FIG. 2 shows a safety device shown in FIG. 1 during the lock releasable condition.

As shown in FIG. 2, when the temperature of the coolant in the radiator 1 is lower than the predetermined temperature value under which the hooks 5a do not engage with the lock portions 6 the cap 3 can be readily detached from the cylindrical fluid supply opening 2 by unscrewing it. On the other hand, if the temperature is higher than the predetermined temperature value under which the hooks 5a engage with the respective lock portions 6, the cap 3 is locked by the lock member 5. Thus, the cap 3 is prevented from being loosened. Accordingly, the lock member 5 acts as a safety device for the radiator cap.

Since the lock member 5 is formed of a shape memory alloy, the lock means L of the present invention merely requires the lock member 5 and the spring 7. Hence, the lock means L is extremely simple in structure and requires few parts.

According to the above described embodiment, the hooks 5a restore to expand outwardly in the drawing when the temperature exceeds the predetermined temperature value to lock the cap 3. However, the present invention is not limited thereto or thereby. For example, the lock member 5 may be arranged so that the hooks 5a restore to disengage from the lock portion 6 when the temperature lowers the predetermined temperature value. In such an arrangement, the lock member formed of a shape memory alloy is previously shaped so that the hooks 5a restores to disengage from the lock portions 6 when the temperature lowers the predetermined temperature value. In this arrangement, a spring or the like may be disposed between the lock members so that the lock members are urged to engage with the respective lock portions provided at the radiator side.

The shape of the hook 5a and the lock portion 6 both acting as the lock means L are not limited to that shown in the drawings. That is, it may be applicable that the lock portion provided at the cylindrical fluid supply opening may be a projection and the hook of the lock member may be provided with a groove which is engageable with the projection of the opening.

According to the safety device for a radiator cap of the present invention, as described above, the cap of the radiator is provided with a lock means which prevents the cap from being detached while the temperature of the radiator is higher than a predetermined temperature value, and the lock action is performed by the lock member formed of the shape memory alloy. Therefore, if the temperature of the radiator exceeds the predetermined value, the cap could not be detached from the radiator thus eliminating the danger of a scald accident or the like due to boiling water. Further, according to the present invention, since the lock action of the cap is performed by the lock member formed of the shape memory alloy, the lock means L is simple in structure and economical to manufacture. In summary, the safety device for the radiator cap of the invention is high in practical use with low in cost.

Other embodiments of the present invention will be apparent to those skilled in the art from consideration of the specification and practice of the disclosed invention. The specification and examples are intended to be exemplary with the true scope and spirit of the invention being represented by the following claims.

What is claimed is:

1. A safety device for a radiator cap detachably mounted on a fluid supply opening having an inner surface of a radiator for sealing the fluid supply opening, comprising:
   a lock means for preventing the radiator cap from being detached from the fluid supply opening when the temperature of coolant located in said radiator is higher than a predetermined temperature value, said lock means being provided between said radiator cap and said inner surface of said fluid supply opening, said lock means being provided in pairs formed of two individual lock means and each of said individual lock means of said pair being spaced a distance from one another;
   said lock means including a lock portion provided on said inner surface of the fluid supply opening and a lock member having two ends, one of said two ends of said lock member fixedly secured to the radiator cap and the other of said two ends of said lock member extending downwardly from the radiator cap into the fluid supply opening, said lock member being formed of a shape memory alloy.

2. The safety device according to claim 1, wherein said other end of said lock member forms a hook and said lock portion forms a groove for engaging said hook of said lock member.

3. The safety device according to claim 1, further comprising a spring between said pair of said lock members to urge said lock members toward one another.

4. The safety device according to claim 2, wherein said lock member is preformed in a first shape of a substantially curved configuration where said hook of said lock member engages said lock portion, said curved configuration is affected when said temperature of said coolant is higher than said predetermined value.

5. The safety device according to claim 2, wherein said lock member is preformed to regain a second shape where said hook of said lock member disengages from said lock portion when said temperature of said coolant is lower than said predetermined value.

6. A safety device for a radiator cap detachably mounted on a fluid supply opening of a radiator for sealing the fluid supply opening, comprising:
   first and second lock means operable in a paired arrangement for preventing the radiator cap from being detached from the fluid supply opening when the temperature of coolant located in said radiator is higher than a predetermined value, said first and second lock means being provided between said radiator cap and an inner surface of said fluid supply opening, each of said lock means including a lock portion provided on said inner surface of the fluid supply opening and a lock member fixedly secured to the radiator cap, said lock member being formed of a shaped memory alloy; and
   a spring situated between said respective lock members of said first and second lock means to urge said lock members toward one another.

* * * * *